United States Patent
Franke

(10) Patent No.: US 10,552,423 B2
(45) Date of Patent: Feb. 4, 2020

(54) SEMANTIC TAGGING OF NODES

(71) Applicant: SAP SE, Walldorf (DE)

(72) Inventor: Jörg Franke, Bruchsal (DE)

(73) Assignee: SAP SE, Walldorf (DE)

( * ) Notice: Subject to any disclaimer, the term of this patent is extended or adjusted under 35 U.S.C. 154(b) by 757 days.

(21) Appl. No.: 15/212,059

(22) Filed: Jul. 15, 2016

(65) Prior Publication Data
US 2018/0018372 A1   Jan. 18, 2018

(51) Int. Cl.
G06F 16/00        (2019.01)
G06F 16/2457      (2019.01)
G06F 16/901       (2019.01)

(52) U.S. Cl.
CPC .... *G06F 16/24573* (2019.01); *G06F 16/9024* (2019.01)

(58) Field of Classification Search
CPC .................................................. G06F 16/24573
USPC ................................................. 707/740, 794
See application file for complete search history.

(56) References Cited

U.S. PATENT DOCUMENTS

| | | | | |
|---|---|---|---|---|
| 7,672,957 B2 * | 3/2010 | Cotichini | ...... | G06F 8/74 707/794 |
| 2005/0267871 A1 * | 12/2005 | Marchisio | ...... | G06F 16/3338 |
| 2006/0080338 A1 | 4/2006 | Seubert et al. | | |
| 2006/0085450 A1 | 4/2006 | Seubert et al. | | |
| 2007/0233574 A1 | 10/2007 | Koegler et al. | | |
| 2015/0205863 A1 * | 7/2015 | Drennan, III | ...... | G06Q 40/08 707/722 |

OTHER PUBLICATIONS

"CDS Annotations for Metadata-Driven UIs," retrieved from http://www.sdn.sap.com/irj/scn/go/portal/prtroot/docs/library/uuid/20256ef6-8d85-3310-0db4-d099f71c9413?QuickLink=index&overridelayout=true&60803852011585, Dec. 8, 2015.
"T011 SAP Table—Financial Statement Versions," retrieved from http://www.se80.co.uk/saptables/t/t011/t011.htm on May 26, 2016, 3 pages.
"Settings for Profit Analysis Based on Invoices and Orders—Configuration Guide," retrieved from http://help.sap.com/saphelp_byd1302/en/KTP/Software-Components/01 on May 26, 2016, 6 pages.
"Edit Financial Reporting Structures," retrieved from http://help.sap.com/saphelp_byd1302/en/KTP/Software-Components/01 on May 26, 2016, 4 pages.
"SAP Business ByDesign Cloud-based ERP for mid-market companies and subsidiaries," retrieved http://go.sap.com/product/enterprise-management/business-bydesign.product-capabilities.html on Jul. 15, 2016, 9 pages.
"SAP Business ByDesign Cloud-based ERP for mid-market companies and subsidiaries," retrieved from http://go.sap.com/product/enterprise-management/business-bydesign.htm on Jul. 15, 2016, 7 pages.

* cited by examiner

Primary Examiner — Chelcie L Daye
(74) Attorney, Agent, or Firm — Klarquist Sparkman, LLP

(57) ABSTRACT

Technologies are described for facilitating query execution. A data network is received. The data network includes a plurality of nodes. Each of the nodes is associated with a portion of stored data. User input is received defining at least one semantic tag. User input is received associating the at least one semantic tag with at least one of the plurality of nodes. The association between the at least one sematic tag and the at least one of the plurality of nodes is stored.

20 Claims, 12 Drawing Sheets

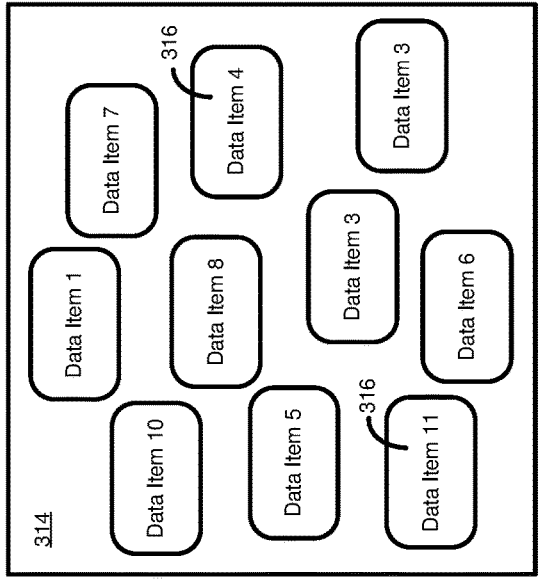
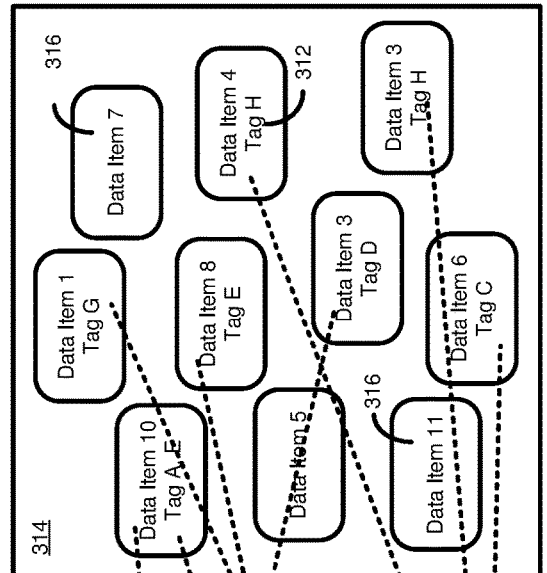
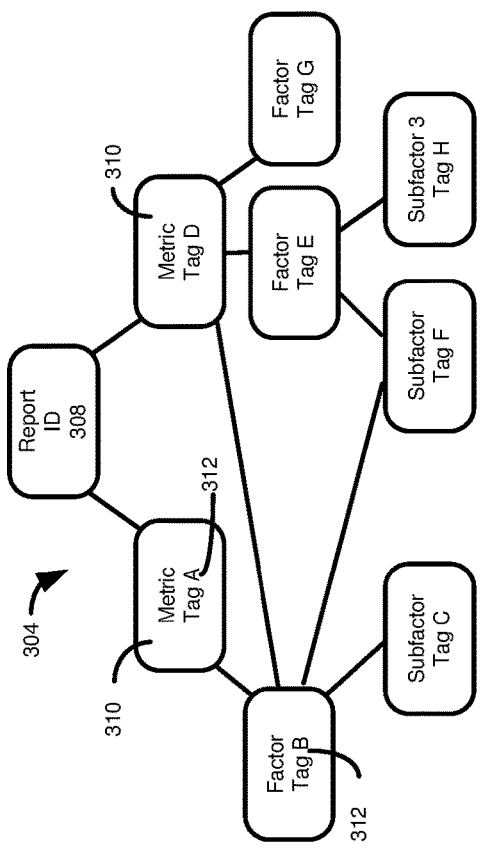
FIG. 3A
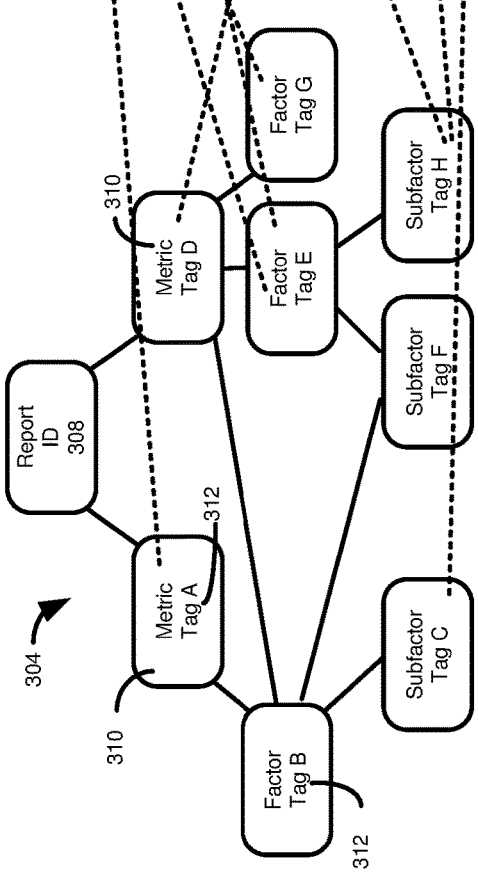
FIG. 3B

SEMANTIC TAGGING OF NODES

FIELD

The present disclosure generally relates to executing queries, such as to generate a key performance indicator or a report. Particular implementations relate to applying one or more semantic tags to one or more nodes, such as networked nodes or nodes of a hierarchy, to facilitate executing a query using the nodes.

BACKGROUND

Databases are commonly used in enterprise resource planning (ERP) applications, which an organization can use to collect data related to the organization, including information related to supply of materials, product planning, purchasing, manufacturing, shipping, inventory, marketing, expenses, and sales. The collected data can be used for a variety of purposes, including financial reporting. The collected data is typically queried to produce various reports. However, organizations often have to generate their own report templates or define their own rules for calculating key performance indicators.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the execution of a query, such as to generate a report. According to a particular method, a data network is received. In particular examples, the data network can be a hierarchy. The data network includes at least first and second nodes. The second node is associated with a portion of stored data, and is useable, at least in part, to determine a value associated with the first node. A plurality of semantic tags are received. User input is received associating a first semantic tag of the plurality of semantic tags with the second node. The association between the first semantic tag and the second node is stored. A query can be executed using the first semantic tag.

According to another disclosed method, a data network, such as a data hierarchy, is received. The data network includes a plurality of nodes. Each of the nodes is associated with a portion of stored data. User input is received defining at least one semantic tag. User input is received associating the at least one semantic tag with at least one of the plurality of nodes. The association between the at least one sematic tag and the at least one of the plurality of nodes is stored. A query can be executed using the at least one semantic tag.

In yet another disclosed method, a data network, such as a data hierarchy, is received. The data network includes a plurality of nodes. Each of the plurality of nodes is associated with a portion of stored data. A plurality of semantic tags are received. User input is received associating a first semantic tag of the plurality of semantic tags with a first node of the plurality of nodes. The association between the first semantic tag and the first node is stored. In one implementation, user input is received associating the first semantic tag with a second node of the plurality of nodes. The association between the first semantic tag and the second node is stored. In another implementation, user input is received associating a second semantic tag of the plurality of semantic tags with the first node. The association between the second semantic tag and the first node is stored.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3A is a diagram illustrating a network for a report and a data collection, the report and the data collection each having a plurality of nodes.

FIG. 3B is a diagram illustrating the report and data collection of FIG. 3A, with semantic tags applied to a portion of the nodes of the data collection to associate the tagged data collection nodes with report nodes.

DETAILED DESCRIPTION

Example 1—Overview

Figure 1:
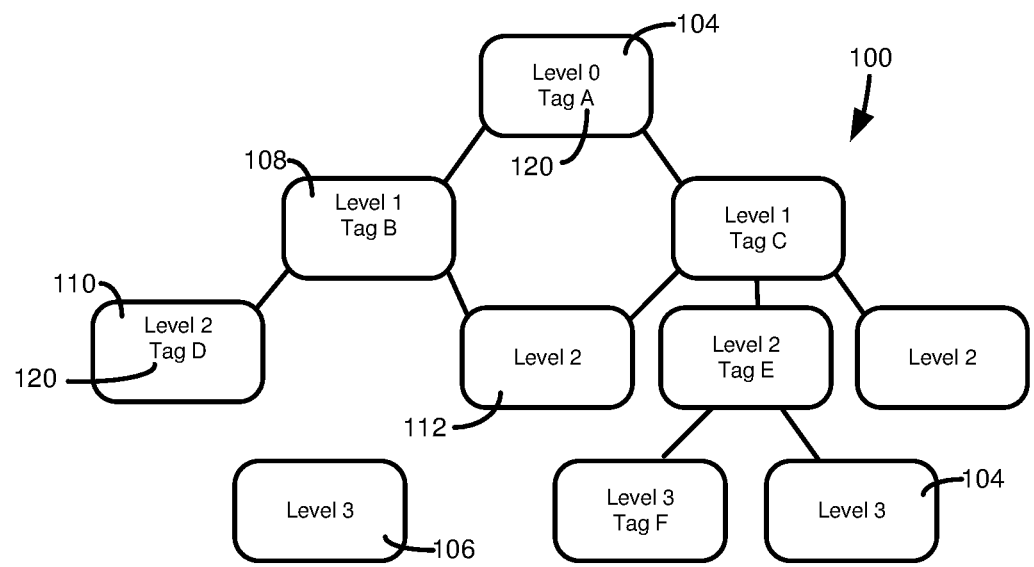
FIG. 1 is a diagram of a network having multiple levels, with one or more nodes at each level of the network, a portion of the nodes being associated with semantic tags.

Data, such as data maintained in a database, can be used for a variety of purposes, including for analyzing the operation of an enterprise. The data is often queried for specific types of information, which may then be used to calculate other values, and the data and/or calculated values organized into a particular format, referred to as a key performance indicator or a report. For example, an enterprise may query various types of data in order to carry out financial reporting.

Organizations may have different structures, and may use different terminology to refer to the same types of information. Differences in organizational structures and terminology can make it difficult for a single report template to be useable by multiple organizations, or even by multiple units of the same organization. For example, if data elements maintained by an organization only include textual descriptions of the semantics associated with the data elements, it can be difficult to use a standard or common report for different organizations, or even different units within an organization. Thus, often, organizations, or units thereof, will have to generate their own key performance indicators or report templates.

Information associated with an enterprise, such as information maintained in a database, can typically be given one or more classifications, or otherwise categorized. Information can be queried based on the classification and included in a report. Information can also be selected for use in calculations based on the classification of the information. The calculated values can also be given a classification, and included in a report or in further calculations.

In at least some cases, information related to the enterprise can be organized in a network (or graph). Particular units of information in the network can be referred to as nodes (or vertices). In some cases, all of the nodes in the network can be connected to at least one other node. In other cases, some, or all, of the nodes are not connected to another node. A network of nodes can be organized with one or more levels or tiers.

For example, a particular item (node) can be located higher than, lower than, or at the same level as another item. In some aspects, a network can be organized in terms of scope, where broader classifications are higher in the network and narrower classifications are lower in the network.

In other aspects, a network can be organized in terms of importance or priority, with items higher in the network having greater importance or priority than items lower in the network. In a further aspect, the network can be organized in terms of dependency, where items higher in the network are dependent on items lower in the network. For example, items lower in the network may be used in calculations to generate one or more values for items higher in the network. In other aspects, the network can be organized in a different manner.

Typically, a network has more than one level. However, in some cases, a network can include a single level. For example, information can be given different classifications, but each classification can be at the same level relative to the other classifications. A report can be generated by obtaining and formatting information according to its classification.

In particular aspects, the network can be a hierarchy. A hierarchy refers to an organization of items (such as information/data elements) having two or more levels, and where each item (node) has, at most, a single parent node, and may have zero or one or more child nodes.

A classification or categorization assigned to a particular type of information can be referred to as a semantic tag. Typically, a variety of semantic tags can be assigned to the same type of information. However, this can create problems, for example, if, for a particular type of information, stored information is classified using one semantic tag and a report defines the information using another semantic tag.

FIG. 1 illustrates a network 100. The network 100 includes a plurality of nodes 104 located at different levels of the network. Generally, a node 104 can contain information, such as one or more data elements, or can represent operations to be taken, such as operations concerning data obtained from a data source, which can include or more nodes 104 of the network 100. In a specific example, a node 104 may represent operations such as performing combinations of data or performing calculations on data. However, in further implementations, the node operations can include other operations.

As shown, the network 100 includes four levels, 0-3. However, the network 100 can have a different number of levels. In some cases, the network 100 can have a single level. Each level in the network 100 can have one or more nodes 104. In at least some cases, the number of nodes 104 between levels can be different or unrelated.

While most of the nodes 104 in the network 100 are shown as connected, or related, in other cases, some, or all, of the nodes 104 may be disconnected, or unrelated, to other nodes in the network. For example, node 106 is not connected to another node 104. In other cases, a node 104 higher in the network 100 (e.g., a parent node) can be connected to one or more child nodes lower in the network. For example, node 108 is shown connected to child nodes 110 and 112. Similarly, a node 104 lower in the network 100 may be connected to one or more nodes (e.g., parent nodes) higher in the network. Although connected nodes of the nodes 104 are shown at adjacent levels in the network 100, in other cases, connected nodes need not be located in adjacent levels. Similarly, in some cases, nodes 104 at the same level in the network 100 (e.g., sibling nodes) can be connected to one another.

In some cases, the network 100 can be used to represent an organization of data, such as data organized for use in the operation of a business. In other cases, the network 100 can be used to represent the structure of a data analysis, such as a query or report, using data, such as data from the operation of a business. In some cases, a network associated with data can be structured identically to a network representing an analysis or summary of the data (generally referred to in the present disclosure as a report). In other cases, the structure of a data network can be different than the structure of a report network, such as having a different number of nodes, a different arrangement of nodes, or different relationships between nodes.

At least a portion of the nodes 104 can be associated with a semantic tag or label 120. The semantic tag 120 may be used to categorize, classify, or otherwise identify a node 104 and its associated content. In some cases, the semantic tag 120 can be used to facilitate performing a query, such as generating a report or analysis, using at least a portion of the nodes 104. As shown, only a portion of the nodes 104 are associated with a semantic tag 120. However, in some aspects, all of the nodes 104 can be associated with one or more semantic tags. Although the nodes 104 having a semantic tag 120 are only shown as associated with a single semantic tag, in at least some implementations, a node 104 may be associated with a plurality of semantic tags. In some cases, a particular semantic tag 120 is associated with a single node 104, while in other cases a semantic tag 120 may be associated with a plurality of nodes 104.

Figure 2:
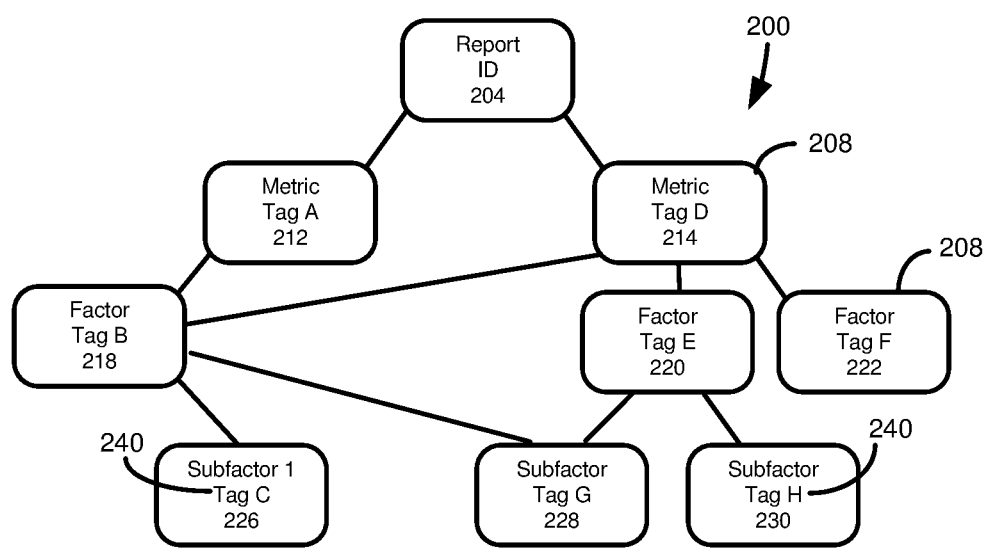
FIG. 2 is a diagram of a report, organized as a network of nodes, at least a portion of the nodes being associated with semantic tags.

FIG. 2 illustrates a network 200 associated with a report 204, which forms the root node of the network, and which may be associated with an identifier. The report 204 may be associated with a particular format or schema, the elements of which are represented by child nodes 208. The report 204 can include metrics (such as key performance indicators), such as metrics 212, 214. Each of the metrics 212, 214 can include one or more factors 218, 220, 222, which in turn can include one or more subfactors 226, 228, 230.

In some cases, a particular factor may be connected to multiple metrics. For example, factor 218 is used by both metric 212 and metric 214. Similarly, in some cases, a particular subfactor can be used by more than one factor. For example, subfactor 228 is used by both factor 218 and factor 220. Although the network 200 has been described as including metrics, factors, and subfactors, the nodes 208 in the network need not include metrics, factors, or subfactors.

According to the present disclosure, a report 204 can be structured other than as depicted in FIG. 2. For example, a report 204 need not include a metric, or can include one or a plurality of metrics. Metrics need not include factors, and may have one or a plurality of factors. Similarly, factors need not include subfactors, or can include one or a plurality of subfactors.

As an example, a report 204 may be related to sales, and metric 212 may represent domestic sales and metric 214 may represent total sales. If factor 220 represents sales in the State of Pennsylvania, factor 220 could be used in calculating both domestic sales 212 and total sales 214.

Each of the child nodes 208 can be associated with one or more semantic tags 240. The semantic tags 240 can be used to indicate information that should be provided to the node 208 in order to generate the report 204. For example, one or more of those nodes 208 can be mapped to one or more of the nodes 104 of the network 100 based on the semantic tags 240 of the nodes 208 and the semantic tags 120 of the nodes 104.

The present disclosure can provide for defining semantic tags, associating one or more semantic tags to one or more nodes in a network, such as a hierarchy, and creating or modifying a network, a query, or a mapping of semantic tags used in the query to nodes in the network. For example, a report may be defined in terms of semantic tags, which semantic tags can be assigned to appropriate nodes of a network.

Example 2—Semantic Tagging of Nodes

FIG. 3A is a diagram illustrating a network 304 for a report 308 and a collection of data 314 from which the report is to be generated. The report 308 includes a plurality of report nodes 310. The report 308 may be at least generally similar to the report 204 of FIG. 2, including having metrics, factors, and subfactors. At least some of the metrics can be determined from one or more factors. At least some of the factors can be determined from one or more subfactors. Each report node 310 is associated with at least one semantic tag 312.

The data collection 314 is shown as having a plurality of unstructured data collection nodes 316. However, in some aspects, at least a portion of the data collection nodes 316 can be structured, such as in a network. In a specific example, the nodes 316 can be structured in a hierarchy. At least some of the data collection nodes 316 may be relevant to, or used in, the report 308.

In order to generate the report 308, relevant data collection nodes 316 should typically be mapped to the appropriate, corresponding nodes 310 of the report 308. For example, FIG. 3A does not provide a correlation between data collection nodes 316 and report nodes 310, and so the report 308 cannot be generated from the information in FIG. 3A.

FIG. 3B illustrates the network 304 and the data collection 314 of FIG. 3A, but with dashed lines indicating a correlation or other relationship between one or more of the data collection nodes 316 and one or more of the report node 310. A particular data collection node 316 can be correlated to one or more of the report nodes 310. However, each of the data collection nodes 316 need not be included in the report 308. A particular report node 310 can be correlated to one or more of the data collection nodes 316. However, in some cases, a particular report node 310 need not have a corresponding data collection node 316. A correlation between a particular report node 310 and a data collection node 316 can be established by labelling the data collection node with the semantic tag 312 of the report node.

Figure 4:
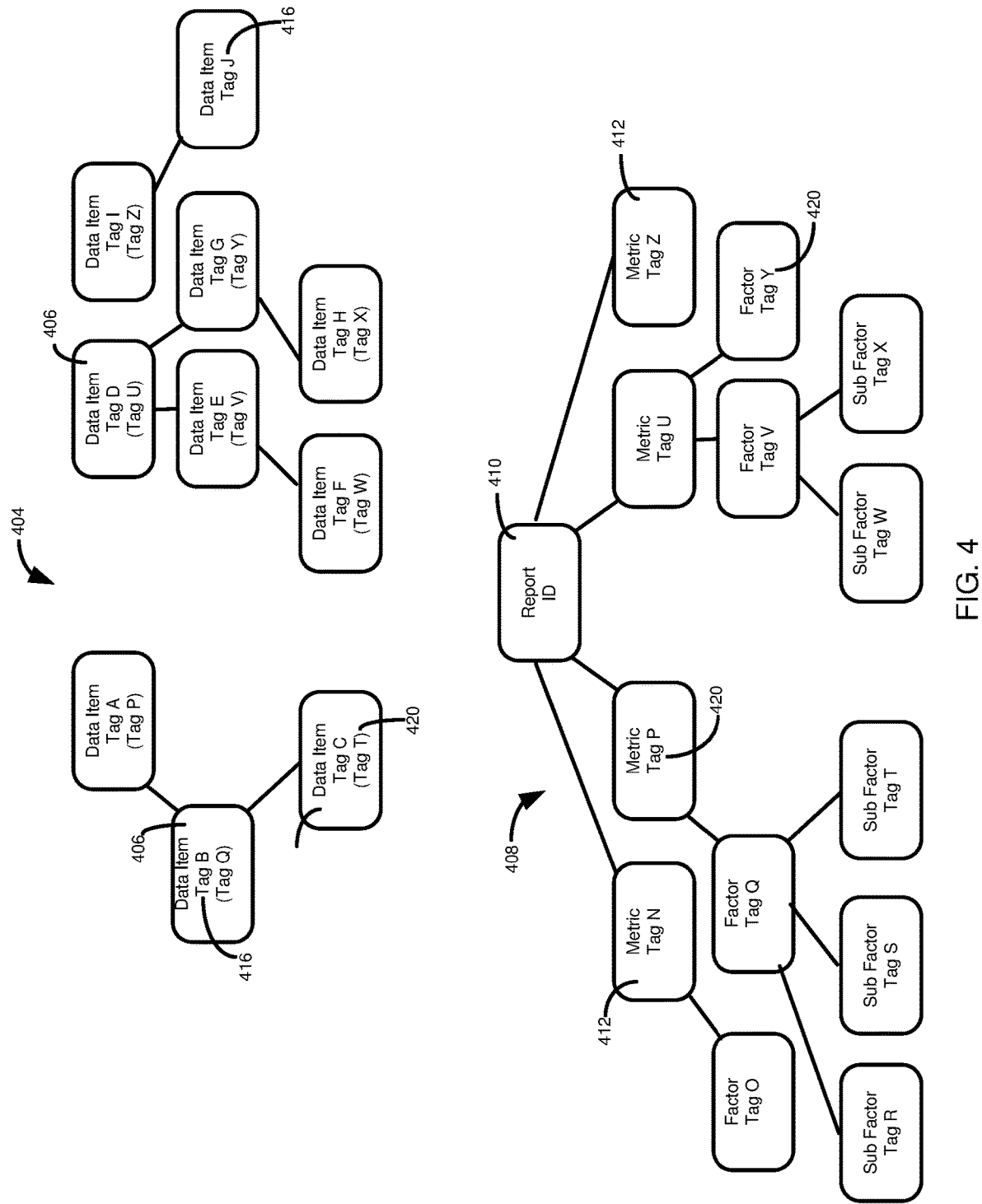
FIG. 4 is a diagram illustrating a hierarchy for a report and a hierarchy for a data collection, each hierarchy having a plurality of nodes, with semantic tags used to associate at least a portion of the report nodes with at least a portion of the data collection nodes.

As discussed above, while, at least in some cases, a data collection can be unordered or unstructured, in other cases, a data collection can be associated with an order or structure. For example, FIG. 4 illustrates a first hierarchy 404 corresponding to a data collection and a second hierarchy 408 corresponding to a report 410.

The nodes 406 of the first hierarchy 404 can be associated with one or more first identifiers 416, such as semantic tags. The nodes 412 of the second hierarchy 408 can be associated with one or more second identifiers 420, such as semantic tags.

In some cases, the first hierarchy 404 and the second hierarchy 408 can be the same, except for differences between at least some of the first identifiers 416 and the second identifiers 420 assigned to equivalent nodes 406, 412. In other cases, such as shown in FIG. 4, the first hierarchy 404 and the second hierarchy 408 may differ in structure (such as number, arrangement, and connections between nodes), as well as having differences between first identifiers 416 and second identifiers 420 assigned to otherwise equivalent nodes.

For example, the second hierarchy 408 has a node 412 for a Metric P associated with a Factor Q, which in turn is associated with Subfactors R, S, and T. The first hierarchy 404 has a node labelled A that corresponds to Metric P of the second hierarchy 408. The node labelled B in the first hierarchy 404 corresponds to Factor Q of the second hierarchy 408. The node labelled C in the first hierarchy 404 corresponds to Subfactor T of the second hierarchy 408. In order to correlate the first and second hierarchies 404, 408, such as to generate the report 410, the nodes 406 of the first hierarchy can be labelled with the identifiers 420 of the corresponding node(s) 410 of the second hierarchy 408.

The first and second hierarchies 404, 408 can have differences in the number and arrangement of nodes 406, 412. While Factor Q of the second hierarchy 408 has three child nodes, corresponding node B of the first hierarchy 404 only has one child node. Metric Z of the second hierarchy 408 has no child nodes, while corresponding node I of the first hierarchy 404 has a child node J.

The relationship between nodes 406, 412 can also differ between the first and second hierarchies 404, 408. For example, node G of the first hierarchy 404, corresponding to Factor Y of the second hierarchy 408, is connected to node H, which corresponds to Subfactor X of the second hierarchy. However, in the second hierarchy 408, Subfactor X is not connected to Factor Y, but to Factor V.

In addition to differences in the number of nodes, and the connections between nodes, nodes may be located at different levels between the first and second hierarchies 404, 408. For example, a node 406 of the first hierarchy 404 may be located higher or lower in the hierarchy than a corresponding node 410 of the second hierarchy 408.

In some cases, nodes that are otherwise equivalent, but with different semantic tags (including where one node is labelled and the equivalent node is unlabeled), can be arranged equivalently between the two structures. For example, the nodes may have equivalent connections to other nodes (or, at least to other nodes which have counterparts in both structures). The nodes can also be located at the same level in a hierarchy (including hierarchies where a structure has a single level). In other cases, the nodes of two structures may differ in one or both of their connection to other nodes and their location (level) in the hierarchy.

Although queries, such as reports, have been described as being organized as networks having nodes, queries can have a different structure, organization, or format. In at least some cases, a query need not have nodes or need not be organized as a network. The query may use semantic tags in some other way, which semantic tags can be assigned (e.g. mapped) to data elements.

Figure 5:
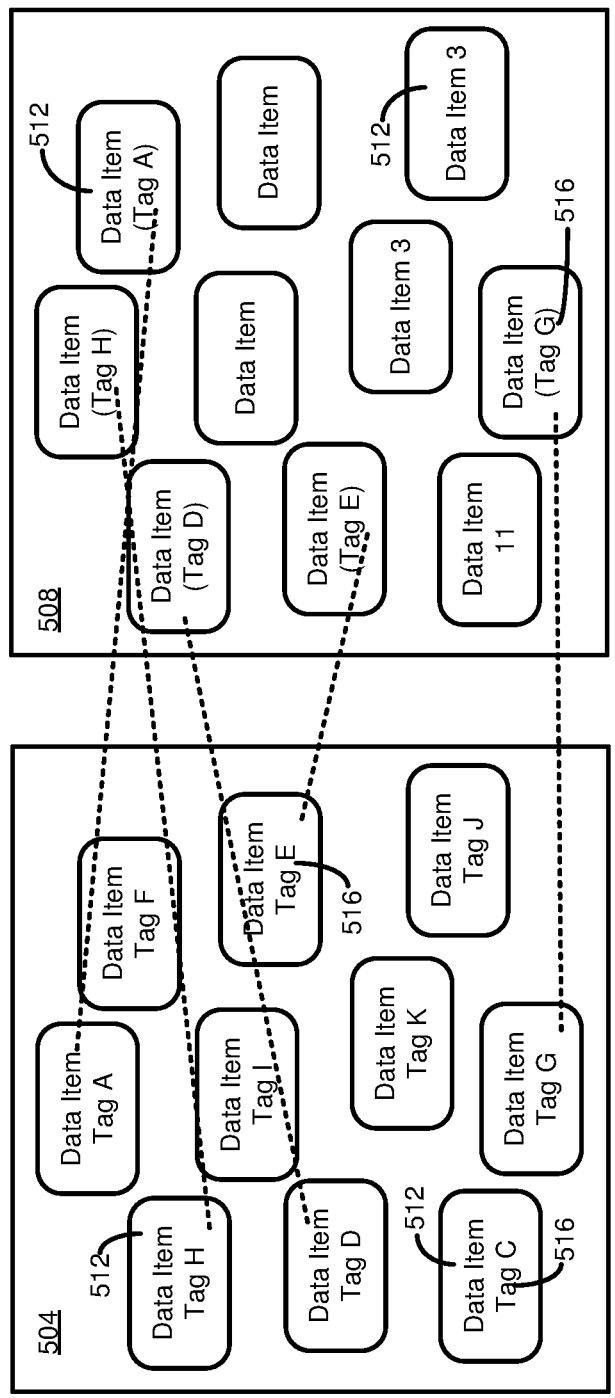
FIG. 5 is a diagram illustrating first and second unstructured data networks, each network having a plurality of nodes, with semantic tags applied to at least a portion of the nodes of the second network to associate them with at least a portion of the nodes of the first network.

FIG. 5 illustrates first and second networks 504, 508 that each include a plurality of disconnected nodes 512. Both networks 504, 508 include a single level. Each of the nodes 512 can include one or more semantic tags 516. Nodes 512 of the second network 508 can be correlated to one or more nodes of the first network 504 by assigning the semantic tag 516 of the first network node to the corresponding second network node.

Figure 6:
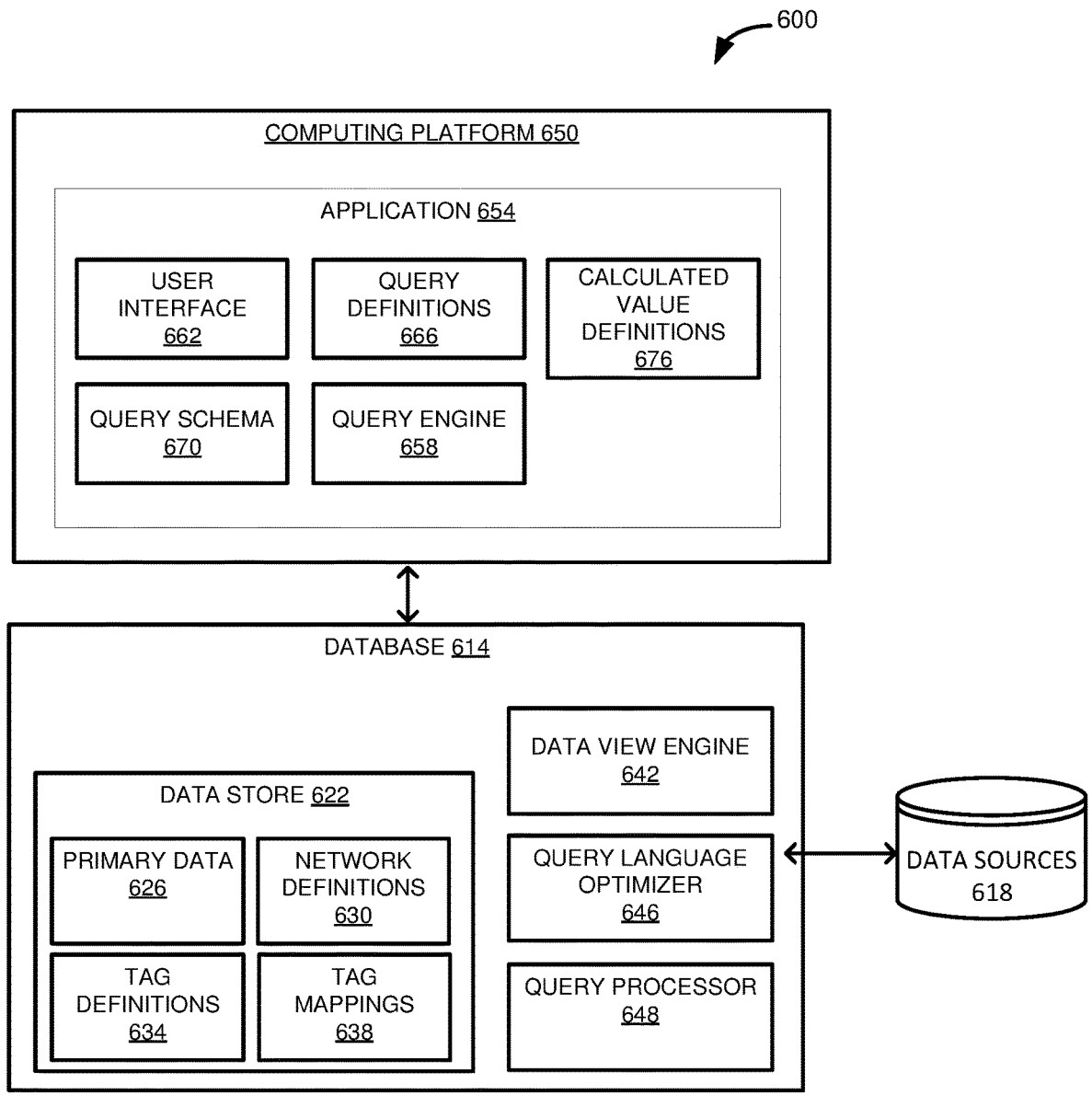
FIG. 6 is a block diagram illustrating an example software architecture in which a computing platform can communicate with a database to associate semantic tags with networked nodes, and to execute queries based at least in part using semantic tags.

FIG. 6 is a block diagram of an example software architecture 600 that can be used to assign semantic tags to a collection of data, such as a network of nodes (for example, a hierarchy), and to retrieve data, such as for a report, query, or analysis, using the sematic tags. The architecture 600 can include a database 614 (for example, the HANA database system of SAP SE of Walldorf, Germany). The database 614 can be in communication with one or more data sources 618. Data sources 618 can include, for example, client applications allowing users to submit requests for database operations to the database 614. The requests for database operations can include requests to add, modify, or delete data from the database 614. Data sources 618 can also include sources such as one or more data warehouses, one or more other database systems, or other data sources.

The data from the data sources 618 can be maintained in a primary data store 626 of a data store 622. In at least some implementations, the primary data store 626 can be a data store against which database write operations (such as SQL INSERT, UPDATE, or DELETE operations) are executed. For example, the primary data store 626 can be used to process OLTP (online transaction processing) requests from the data sources 618.

The data store 622 of the database 614 can further include a network definition store 630. The network definition store 630 can, for example, define a plurality of data nodes. Each data node can also store relationships, if any between nodes. For example, if the network includes multiple levels, the network definition store 630 can store parent-child relations between the nodes. In other cases, the network includes a single level, in which case the network definition store 630 can store relationships between the nodes. According to an aspect of the present disclosure, at least some of the nodes in the network need not be related to other nodes in the network.

The data store 622 can also include a semantic tag (or label) store 634. For each semantic tag, the semantic tag store 634 can store information regarding the tag. Stored information can include a tag identifier and, optionally, additional information regarding the sematic tag. For example, a sematic tag may be associated with a identifier, such as a numerical identifier, an abbreviated name, a name, schema information (such as formatting or other information relating to how the semantic tag, or information associated with the semantic tag, should be formatted, displayed, or processed), relationships to other semantic tags (which can be associated with nodes, and which can define, for example, how information associated with those semantic tags should be combined, calculated, or otherwise processed), other information, or combinations thereof.

A tag mapping store 638 can store one or more mappings of semantic tags to nodes in a data collection. The tag mapping store 638 can be maintained in memory or in a persistent format. In a particular example, the tag mapping store 638 stores an association between a tag identifier associated with the semantic tag store 634 and one or more nodes in the network definition store 630. Not all tags in the tag definition store 634 need to be mapped to a node in a data collection in the network definition store 630. Similarly, not all nodes in a network of the network definition store 630 need to be mapped to a semantic tag in the semantic tag store 634.

The database 614 can include a data view engine 642. The data view engine 642 can be used, for example, to produce an aggregation or visualization of data from the data store 622 and, optionally, other data sources. In some cases, data to be included in a view, such as to be provided to a user, can be distributed among multiple sources, such as multiple stores of the data store 622 and/or other data sources (such as the data sources 618), or among multiple tables in one or more of the data stores of the data store 622 or other data sources. The data view engine 642 can be used to map data maintained in the data store 622 and/or other data sources to a definition for the view or representation.

In at least some implementations, the data view engine 642 can apply a mapping between data in the data store 622, such as in the primary data store 626, a network defined in the network definition store 630, and one or more semantic tags in the semantic tag store 634. For example, the data view engine 642 can retrieve, such as from the tag mapping store 638, and apply a semantic tag mapping from the semantic tag mapping store. The data view engine 642 can format data from the primary data store 626 associated with a node of a network stored in the network definition store 630 based on the associated semantic tag of the semantic tag definition store 634.

A query language optimizer 646 can be included in the database 614. The query language optimizer 646 can be used to create (and optionally store or retrieve) an execution plan for a query language statement. For example, while a query language statement (such as a SQL statement) specifies information that data should contain, it may not describe how to carry out read and write operations associated with the statement. The query language optimizer 646 can determine appropriate operations to carry out the query language statement, including attempting to optimize the operations, such as in a query plan. The operations can be executed by a query processor 648, such as to provide data to the data view engine 642.

The database system 614 can be in communication with a computing platform 650 (for example, the NETWEAVER platform of SAP SE of Walldorf, Germany). The computing platform 650 can include an application 654 (for example, the Integrated Business Planning application of SAP SE of Walldorf, Germany) that includes a query engine 658. The query engine 658 can receive user input through a user interface 662. In some cases, the user interface 662 can include a web services component, such as a component to send and receive information using the HTTP protocol. The user interface 662 can include, for example, an application server (such as a Java Enterprise Edition, Microsoft .NET, or ABAP application server) or an interpreter, such as for html, XML, or JSON data.

User input through the user interface 662 can be used to request that a query, such as a report, be performed on data in the primary data store 626. The query may be associated with a query definition, such as report definition stored in a query definition store 666. The query definition store 666 can, for example, store information regarding what types of data are relevant to a particular query, including a network definition of the network definition store 630 and a tag mapping of the tag mapping store 638. In turn, the tag mapping can specify tag definitions of the tag definition store 634 relevant to the query.

A particular query definition of the query definition store 666 can be associated with a particular query schema 670. The query schema 670 can at least partially determine how query results will be presented to a user. For example, the query schema 670 can modify or augment a view of the data view engine 642. In a particular case, the data view engine 642 provides a base view for a particular query. Specific users may be associated with a modified version of this base view, wherein the modifications are stored in the query schema 670.

A query definition of the query definition store 666 can include commands, or information sufficient to generate commands, to cause the query language engine 658 to send appropriate commands to the database 614 to execute the query. For example, the query definition can include query language statements to carry out the query (such as OData or structured query language statements), or information sufficient for the query engine 658 to generate such statements.

The application 654 can also include calculated value definitions in a calculated value definitions store 676 for elements of the query, or definitions of relationships between elements of the query. For example, the definitions can include combinations of data from the primary data store 626 (such as based on a network of the network definition store 630) or calculations made using data from the primary data store 626, including data identified using a network definition of the network definition store 630.

User input through the user input 662 can be used for other purposes. For example, user input can be used to create, edit, or select semantic tags. User input can also be used to create, edit, or select networks, queries, or semantic tag mappings.

The architecture 600 may be structured other than as shown in FIG. 6. For example, various components can be combined, separated into additional components, or placed at other locations. In addition, at least certain components, such as the computing platform 650, can be omitted from, or other components can be included in, the architecture 600. For example, the database 614 can include the user interface 662 and the query engine 658.

Similarly, the database 614 may be structured in another manner. Although the individual data stores 626, 630, 634, 638 are shown in a common data store 622, they may be stored in the database 614 in another manner. In addition, at least some of the data stores in the data store 622, such as the network definition store 630, the tag definition store 634, or the tag mapping store 638, can be stored other than in the database 614, such as being stored at the computing platform 650. In some cases, the computing platform 650 and the database 614 are located on different computing systems. In other cases, they can be located on the same computing system. Although the database 614 is shown as a unitary component, in at least some cases, the database 614 can be distributed among multiple computing systems, such as multiple nodes in a distributed database system.

While this Example 2 can be implemented in other manners, an advantage of at least certain features of the architecture 600 depicted in FIG. 6 is that it can leverage capabilities of the database system 614. For example, selection and merging of data can be carried out by the data view engine 642 and the query processor 648, rather than using (or solely using) the application 654 or computing platform 650. This arrangement can be more efficient, as the database 614 may have more processing capacity and faster access to data than the computing platform 650 or the application 654. In addition, in particular examples, the selection and merging of data can be carried out using query language statements (e.g., SQL statements), which can be simpler and more efficient to implement and execute than filtering and selecting data using a program written in a programming language such as C++.

Figure 7:
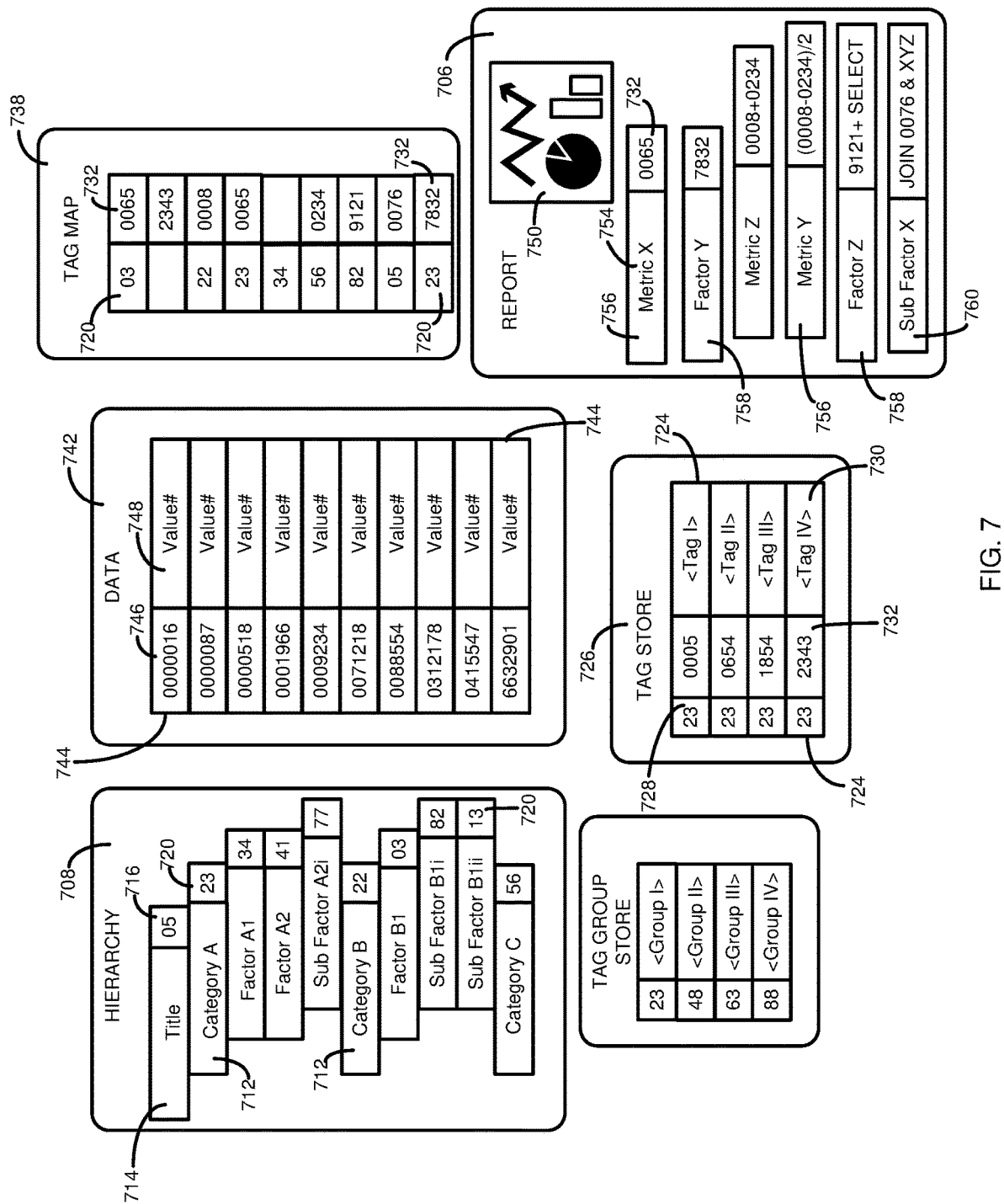
FIG. 7 is a diagram illustrating software components that may be used to provide a report.

FIG. 7 illustrates a particular example of a how a report 706 may be generated by applying semantic tags to a data collection 708, such as data organized in a hierarchy (although, the data can be organized, more generally, as a network). The hierarchy 708 includes a plurality of nodes 712 related to one more topics, such as indicated by a title (or similar descriptor) 714. The title 714 can be associated with a title identifier 716.

The nodes 712 can be at different levels of the hierarchy 708 or at same level in the hierarchy. In some cases, the nodes 712 can be related to other nodes, such as a parent node or one or more child nodes, while in other cases the nodes need not be related to one another. For example, the node corresponding to Category A includes nodes for Factor A1, Factor B1, and Sub Factor A2i. In some implementations, the nodes within Category A represent narrower categories (species) falling within a broader category (genus) represented by Category A. In further implementations, the nodes within Category A may be used to determine a value associated with Category A, instead of, or in addition to, representing information falling within Category A. Similarly, Factor A2i may represent a narrower class of information falling with the broader class of information represented by Factor A2.

While Category B falls within the general topic associated with the title 714, in at least some cases, it need not have an association or relationship with Category A. For example, Category A and Category B may be at the same level in the hierarchy 708. In other cases, nodes 712 at the same level of the hierarchy 708 can have another relationship. For example, a node 712 in the hierarchy 708 may represent the value of another node and one or more additional nodes or other data. Rather than referring to all the relevant nodes 712 at a lower level of the hierarchy 708, a given node may refer to a node at its same level in the hierarchy (or, in some cases, a node higher in the hierarchy) and additional nodes or information used by the given node. Referring to nodes 712 at the same (or higher) level in the hierarchy 708, rather than lower-level nodes, may, for example, speed queries or calculations involving the hierarchy 708, as it can avoid redundant calculations. Avoiding redundant calculations can be beneficial, particularly when a large quantity of data must be read or manipulated in order to determine the value of a node 712.

One or more of the nodes 712 can be associated with an identifier 720. The identifier 720 can be used for a variety of purposes, including associating a node 712 with one or more semantic tags 724. One or more semantic tags 724 can be stored in a semantic tag store 726, which can correspond to the semantic tag definition store 634 of FIG. 6. In other implementations, the semantic tag store 726 can be structured differently than the semantic tag definition store 634.

The semantic tag store 726 can store data related to the semantic tags 724. For example, each semantic tag 724 can be associated with a semantic tag group, indicated by a group identifier 728. Group identifiers 728 can be useful, for example, when it is desired to retrieve (such as for viewing or editing) all semantic tag 724 associated with a particular group (which could be, for example, a group associated with the title 714 or nodes of the hierarchy 708). Group identifiers 728 can also be useful when one or more other data items for a particular semantic tag 724, such as a text string 730 describing the identifier, may be duplicated among one or more other semantic tags. The data for the semantic tags 724 can also include information such as an identifier 732, such as a numerical identifier.

The identifier 732 can be used, for example, in mapping the semantic tag 724 to one or more data collections, or a query, such as the report 706. For instance, the mapping may be stored in a tag map 738, which may be, for example, the tag mapping store 638 of FIG. 6. In other cases, the tag map 738 may be structured in a different manner than the tag mapping store 638. The tag map 738 associates identifiers 720 for each of a plurality of nodes, such as nodes 712 of the hierarchy 708 with identifiers 732 for one or more semantic tags 724. In some cases, the tag map 738 can have a one-to-one mapping between semantic tag identifiers 732 and node identifiers 720. For example, node 22 is associated with the single tag identifier 0008. Tag identifier 0008 is not associated with any other node identifiers 720.

In other cases, the tag map 738 can have a one-to-many, many-to-one, or many-to-many mapping between tag identifiers 732 and node identifiers 720. For instance, node 23 is associated with both tag 0065 and tag 7832. This type of mapping may be useful when, for example, a particular node is relevant to multiple sections of the report 706. Tag 0065 is associated with both node 03 and node 23. This type of mapping may be useful when multiple quantities are used to determine (such as to calculate) a particular value for a report. In some cases, not all node identifiers 720 or tag identifiers 732 need be mapped. Tag identifier 2343 is not mapped to a corresponding node. Node 34 is not mapped to a corresponding tag identifier. Unmapped nodes 712 can occur when, for example, the hierarchy 708 includes nodes 712 which are not of relevance to the report 706, or when a report can draw from multiple values (represented by nodes 712), only a portion of which may be present in the hierarchy 708, and its underlying data.

Data associated with the hierarchy 708 can be stored in a data store 742. The data store 742 can be, for example, the primary data store 626 of FIG. 6. Data items 744 in the data store 742 can be associated with an identifier 746, such as a record ID or other identifier, and one or more values 748. The identifiers 746 can be used to retrieve the corresponding value 748 of a data item 744, such as in response to a query to generate the report 706.

The report 706 can include graphical depictions 750 of the data and/or textual descriptions 754 of the data. As shown, the report 706 includes metrics 756, factors 758, and subfactors 760. In various cases, one or more metrics 756, factors 758, or subfactors 760 can correspond directly to data from the data store 742, such as individual records 744 in the data store or collections of data records. Individual records 744 or collections of records may have calculations performed on them prior to being included in the report 706. Collections of records 744 can be subject to weighting or filtering.

In other cases, one or more metrics 756, factors 758, or subfactors 760 can correspond to a node 712 in the hierarchy 708. In some examples, the metrics 756, factors 758, or subfactors 760 can be a combination of nodes 712, or a combination of one or more nodes 712 and additional data, such as data in the data store 742. At least a portion of the one or more metrics 756, factors 758, or subfactors 760 are defined at least in part by at least one semantic tag 724. For example, Metric X is associated with tag 0065. In turn, via the mapping table 738, the tag 0065 is associated with nodes 03 and 23 of the hierarchy 708. In turn, nodes 03 and 23 can be associated with data in the data store 742. Similarly, Factor Y is associated with tag 7832. Via the mapping table 738, tag 7832 is associated with node 23 of the hierarchy 708. In turn, node 23 of the hierarchy 708 can be associated with data in the data store 742.

Metric Z is shown as associated with the combination of semantic tags 0008 and 0234. In some cases, this can represent the sum of data elements (such as of the data store 742) associated with nodes 22 and 56, respectively. However, the semantic tags can be combined in some other manner. For example, Metric Y is shown as the result of dividing the difference of the nodes associated with semantic tags 0008 and 0234 (nodes 22 and 56) by two. Semantic tags 724, and their corresponding data, may be combined in other mathematical fashions.

Factor Z and Subfactor X illustrate report features formed from combining data associated with semantic tags 724 using query language operations. For example, Factor Z is provided by combining semantic tag 9121 with the results of a SQL select statement. Subfactor X is determined by performing a JOIN operation with data associated with semantic tag 0076 and additional data. In other embodiments, data associated with a semantic tag, through mapping to one or more nodes, is associated with additional data in some other manner.

Figure 8:
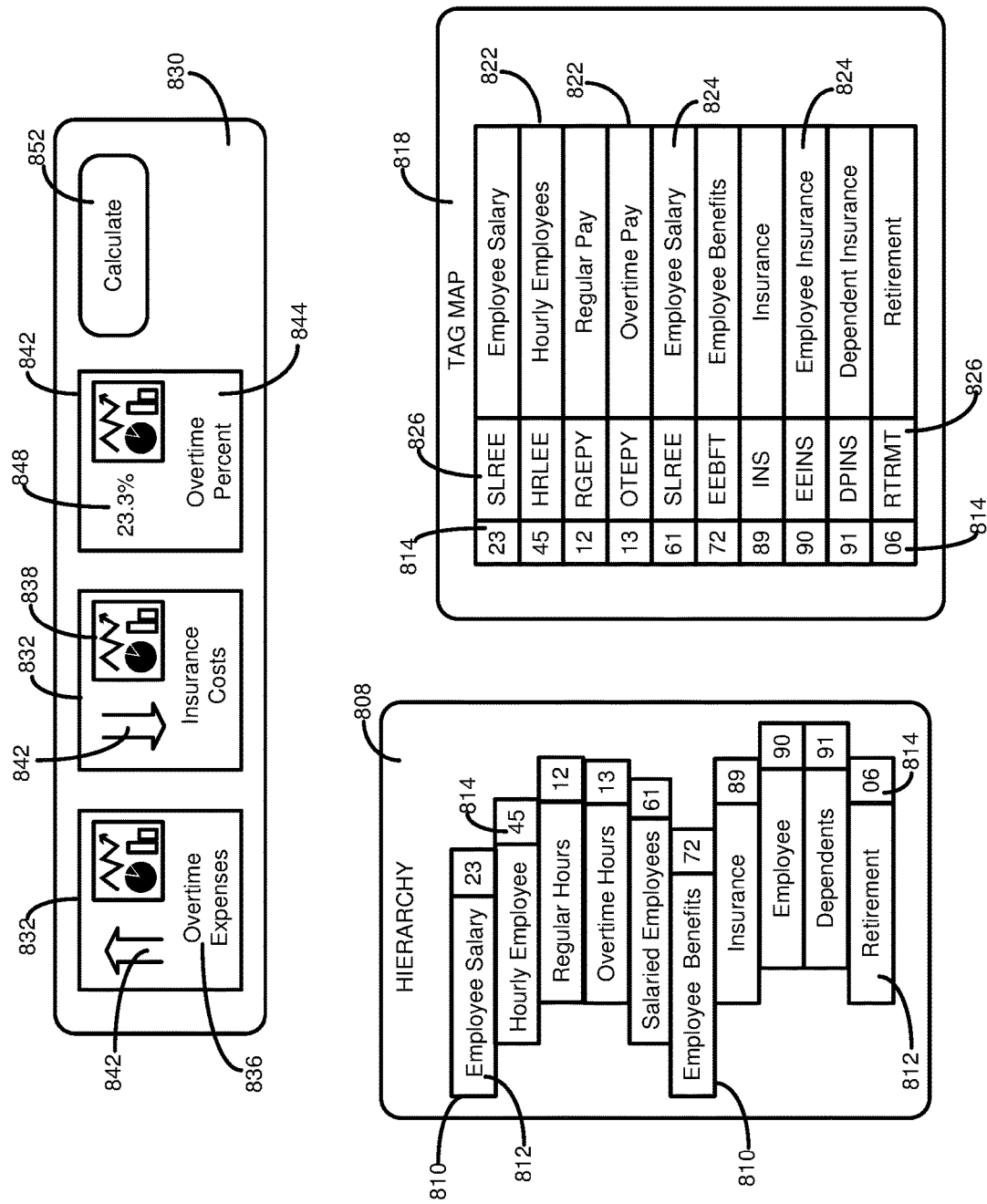
FIG. 8 is a diagram illustrating software components that may be used to provide a display of one or more metrics.

FIG. 8 illustrates how semantic tags can be applied to nodes 810 in a hierarchy 808 to calculate various metrics. Although FIG. 8 illustrates a hierarchy, the discussion can apply more generally to a network of nodes. Each of the nodes 810 is associated with a description 812 and a node ID 814. In at least some cases, a portion of the nodes 810 need not be assigned a node ID 814.

A tag map 818 stores a mapping between at least a portion of the nodes 814 and semantic tags 822. The semantic tags 822 can include a textual description 824 and a tag identifier 826. As shown, the tag identifier 826 is an abbreviated version of the tag description 824. In some implementations, the tag identifier 826 can be different (or can include additional identifiers), such as being a numerical identifier or a text string that need not be similar or related to the description 824. In further implementations, the tag map 818 can include fewer or additional pieces of information regarding the semantic tags 822. For example, each semantic tag 822 can be associated with a semantic tag group identifier (as discussed above), an identifier for the hierarchy 808, or an identifier for a report/metric display 830.

The metric display 830 includes individual display elements 832 for one or more metrics. Each individual metric display element 832 can include a textual description 836 of the metric, and graphical or textual information 838 regarding a value associated with the metric.

Optionally, the display elements 832 can include additional information regarding the metrics. In some aspects, the display elements 832 can include information regarding the meaning or interpretation of the metrics. Two of the display elements 832 include an arrow 842, which can indicate, for example, a trend or change in the metric compared to a previous time, or in other cases, a forecasted trend or change.

In a further example, the display elements 832 can indicate the result of comparing the value of the metrics with a threshold value, or other analysis. In addition to graphical elements such as shapes, information can be provided by highlighting or otherwise emphasizing all or a portion of a display element 832, such as displaying all or a portion of the display element in a color that provides information regarding the corresponding metric (such as green for metrics which are within an acceptable range, red for metrics which have exceeded an acceptable range, or yellow for metrics which are close to exceeding an acceptable range). Display element 844 displays numerical value 848 related to a metric. In the particular example, display element 842 may represent the percentage of salary expenses due to overtime hours.

A selectable icon 852 may be provided to allow a user to update the values shown in the metric display 830. Updating the values can include, for example, updating the values to include recently added data to a data source accessed by the hierarchy 808. In other cases, the selectable icon 852 may allow a user to evaluate changes to assignments in the tag map 818. For instance, a user may edit the mapping between the semantic tags 822 and the nodes 810, and then evaluate the effect on the metrics by selecting the icon 852.

Figure 9:
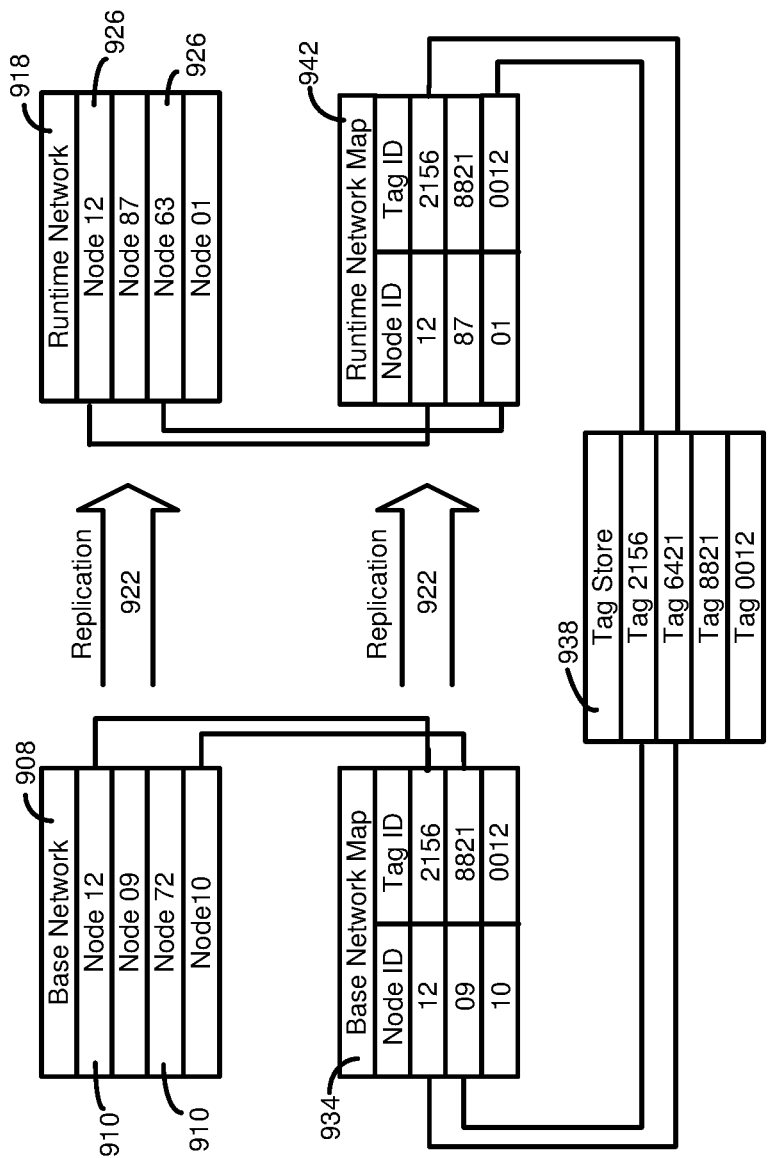
FIG. 9 is a diagram illustrating the replication of a base network and a base network semantic tag mapping to a runtime network and a runtime semantic tag mapping.

In some cases, processing a network of nodes can be computationally intensive, such as requiring significant time, processing power, or memory use. In such cases, it can be beneficial to pre-process at least certain information associated with the network in order to speed query processing/delivering a data analysis to a user. FIG. 9 illustrates a base network 908. In specific examples, the base network 908 can be organized in a similar manner to the hierarchy 708 of FIG. 7 or the hierarchy 808 of FIG. 8. A plurality of nodes 910 in the base network 908 can be associated with underlying data (not shown, but may be at least analogous to the data store 742 of FIG. 7).

The base network 908 can be converted to a runtime network 918 through a replication process 922. The replication process 922 can, for example, perform queries, calculations, and or analysis of data associated with the nodes 910. At least some of results can be stored in the runtime network 918 having a plurality of nodes 926. In some cases, at least some of the nodes 926 in the runtime network 918 can be unchanged from the base network 908. At least some of the nodes 926 are different than the nodes 910, such as having a different location within the network 918, a different relationship with other nodes 926, or different node identifiers.

In addition to queries, calculations, or other analyses, the replication process 922 can evaluate the node structure of the base network 908, including for example, the position of nodes 910 within the base network and relationships between nodes.

The first time the replication process 922 is called, the runtime network 918 can be generated. In some cases, a request by a user to access a network, such as to generate a report, can be directed to the runtime network 918. As relevant data may have already been retrieved, and relevant values calculated, results may be returned quickly to the user. In addition, relationships between nodes 926 can be determined and stored in a manner that allows information from relevant nodes to be quickly retrieved.

In some cases, when a request to access a network is received, the replication process 922 can be executed. If the runtime network 918 has been previously generated, the replication process 922 can compare the runtime network 918 to the base network 908 to determine if the runtime network should be updated, such as to reflect changes to the underlying data or the structure of the base network. If changes have occurred, the changes may be replicated to the runtime network 918, which can require less time and computing resources than processing an entire query, or generating a complete runtime network. In other cases, the replication process 922 can be triggered in additional or alternative ways. For example, the replication process 922 may be executed periodically, in response to user input (such as by an administrator or by an end user), or automatically in response to particular events (such as updates to data used by the base network 908 or the structure of the base network).

The base network 908 can be associated with a base network semantic tag map 934. The base network semantic tag map 934 can be structured analogously to the tag map 738 of FIG. 7 or the tag map 818 of FIG. 8. The base network semantic tag map 934 may be associated with a semantic tag store 938, which can be analogous to the tag store 726 of FIG. 7. The base network semantic tag map 934 can associated one or more semantic tags of the semantic tag store 938 to at some of the nodes 910 of the base network 908.

In at least some cases, the structure or identifiers of the nodes 910 of the base network 908 may be different than the structure or identifiers of the nodes 926 of the runtime network 918. In such cases, the replication process 922 can translate the base network semantic tag map 934 to a runtime network tag map 942. The runtime network tag map 942 can associate semantic tags of the semantic tag store 938 to at least some of the nodes 926 of the runtime network 918.

Figure 10:
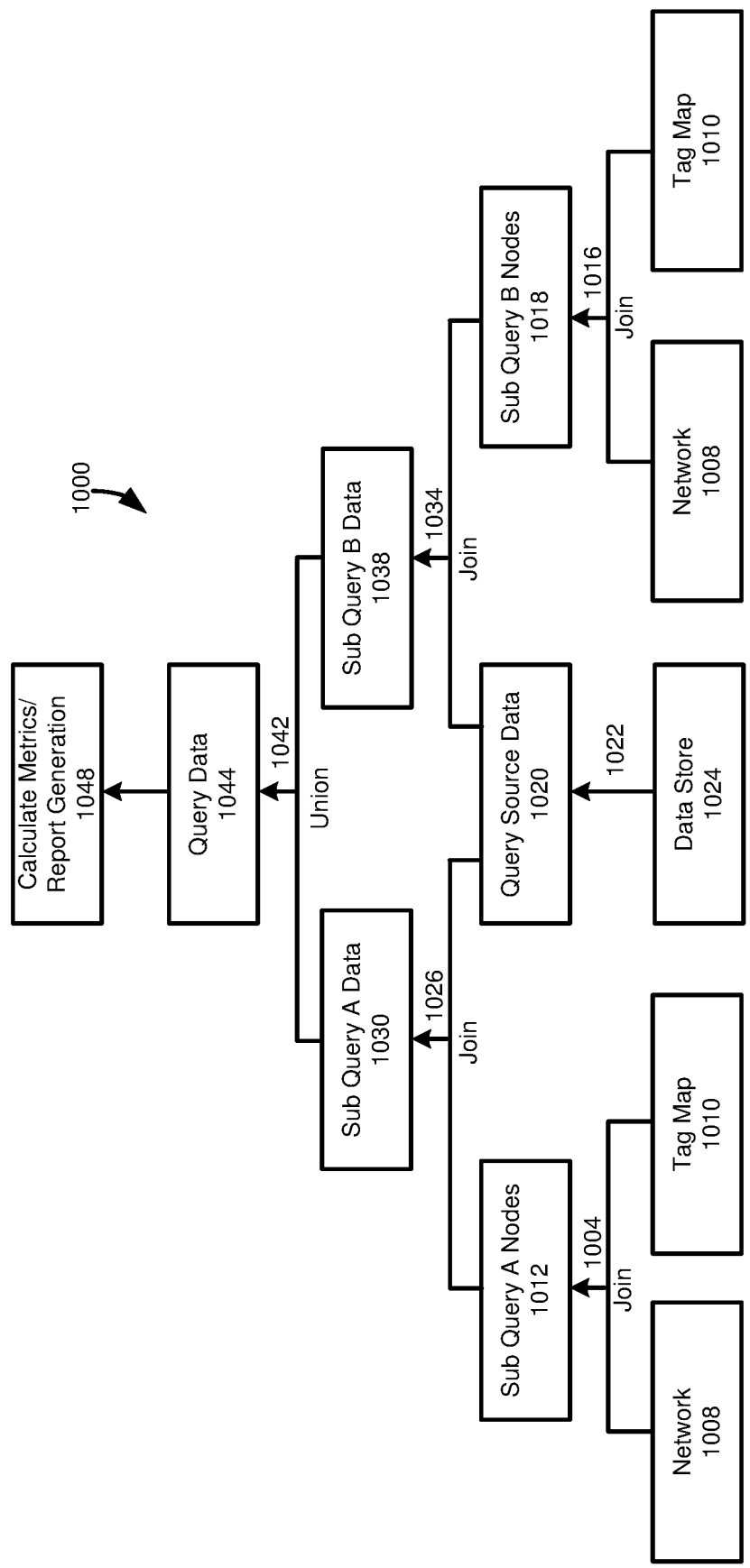
FIG. 10 is a diagram illustrating a method for executing a query, having sub-queries A and B, using semantic tags.

FIG. 10 illustrates a method 1000 for executing a query, such as for calculating one or more metrics and/or generating a report, using a network, a network tag map, and data in a data store, according to an embodiment of the present disclosure. The method 1000 can be executed, for example, using the software architecture 600 of FIG. 6. The illustrated query is executed as having a subquery A and a subquery B. The subqueries can be used, for example, when underlying data is associated with different categories, or some data is categorized and other data is uncategorized. Data associated with the two subqueries can represent data relevant to the query.

In process 1004, data is combined, such as using a SQL JOIN operation, from a network (such as a hierarchy or other data collection) 1008 and a semantic tag map 1010 for the network. The semantic tag map 1010 can be associated with a semantic tag store (not shown). The process 1004 selects nodes 1012 from the network 1008 relevant to subquery A Similarly, in process 1016, data is combined, such as using a SQL JOIN operation, from the network 1008 and the semantic tap map 1010. The process 1016 selects nodes 1018 from the network 1008 relevant to subquery B.

Data 1020 relevant to the query, including subquery A and subquery B, can be selected in process 1022 from a data store 1024. In process 1026, data is combined, such as using a SQL JOIN operation, from the nodes 1012 relevant to subquery A and their corresponding data from the query source data 1020 to produce subquery A data 1030. In process 1034, data is combined, such using a SQL JOIN operation, from the nodes 1018 relevant to subquery B and their corresponding data from the query source data 1020 to produce subquery B data 1038.

Subquery A data 1030 and subquery B data 1038 are combined, such as using a SQL UNION operation, in process 1042 to provide query data 1044. In process 1048, the query data 1044 is used to generate the report and/or calculate metrics or other values.

Figure 11:
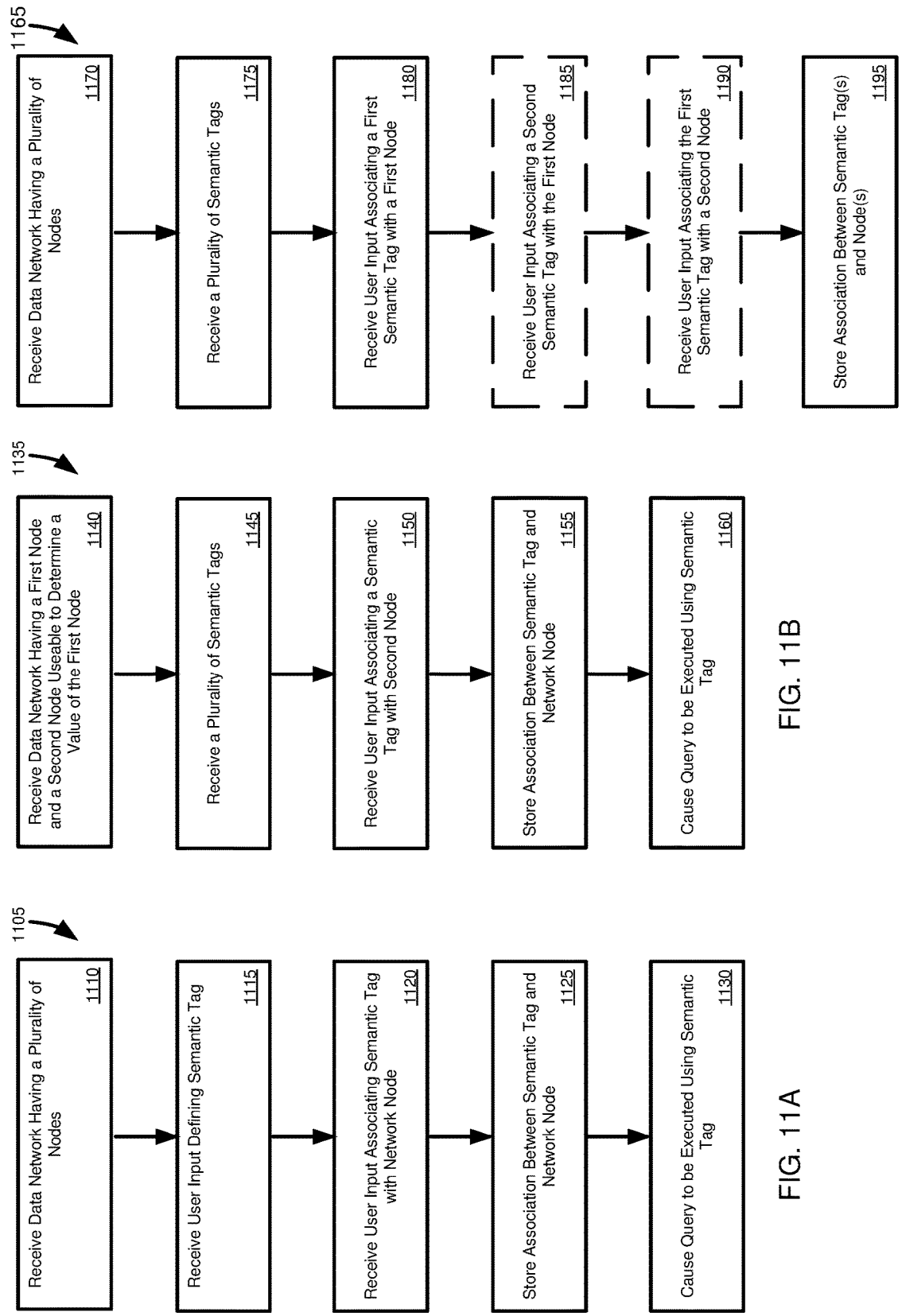
FIG. 11A provides a flowchart of a method of defining a semantic tag, assigning a semantic tag to a network node, and executing a query using the semantic tag.
FIG. 11B provides a flowchart of a method of assigning a semantic tag to a second network node useable to calculate a value of a first network node.
FIG. 11C provides a flowchart of a method of assigning multiple semantic tags to a network node or assigning a particular semantic tag to a plurality of network nodes.

FIG. 11A illustrates a method 1105 for executing a query, such as to generate a report, using at least one semantic tag assigned to at least one node of a network (such as a hierarchy). In step 1110, a data network having a plurality of nodes is received. In step 1115, user input is received defining a semantic tag. User input associating the semantic tag with a node of the network is received in step 1120. The association between the semantic tag and the network node is stored in step 1125. In step 1130, a query, such as a report, is caused to be executed using the semantic tag.

FIG. 11B illustrates a method 1135 for executing a query, such as to generate a report, using a semantic tag. In step 1140, a data network (such as a hierarchy) is received having at least first and second nodes. The second node is useable to determine a value of the first node. A plurality of semantic tags are received in step 1145. In step 1150, user input is received associating a sematic tag of the plurality of semantic tags with the second node. The association between the semantic tag and the second node is stored in step 1155. The query is caused to be executed using the semantic tag in step 1160.

FIG. 11C illustrates a method 1165 for associating one or more semantic tags with one or more nodes of a network (such as a hierarchy). In step 1170, a data network is received having a plurality of nodes. A plurality of semantic tags are received in step 1175. In step 1180, user input is received associating a first semantic tag of the plurality of semantic tags with a first node of the plurality of nodes. In optional step 1185, user input is received associating a second semantic tag of the plurality of semantic tags with the first node. In optional step 1190, user input is received associating the first sematic tag with a second node of the plurality of nodes. Associations between one or more semantic tags and one or more nodes is stored in step 1195.

Example 3—Computing Systems

Figure 12:
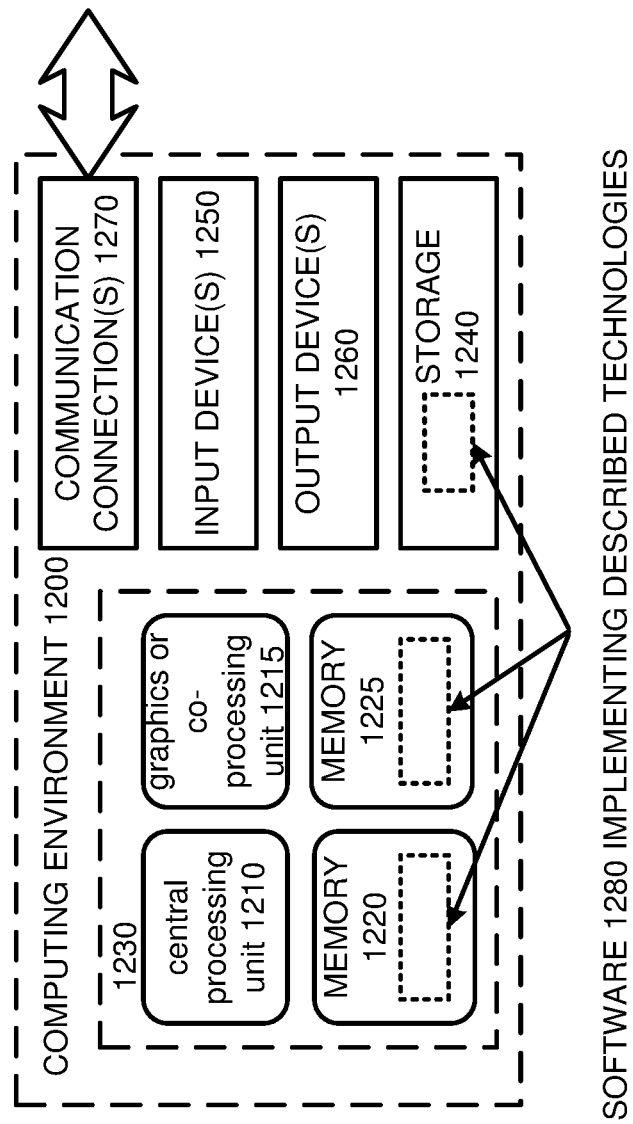
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing a database environment, and associated methods, described in Examples 1 and 2. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215. The memory 1220, 1225, may also store database data, such as data associated with the database 614 of FIG. 6.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 4—Cloud Computing Environment

Figure 13:
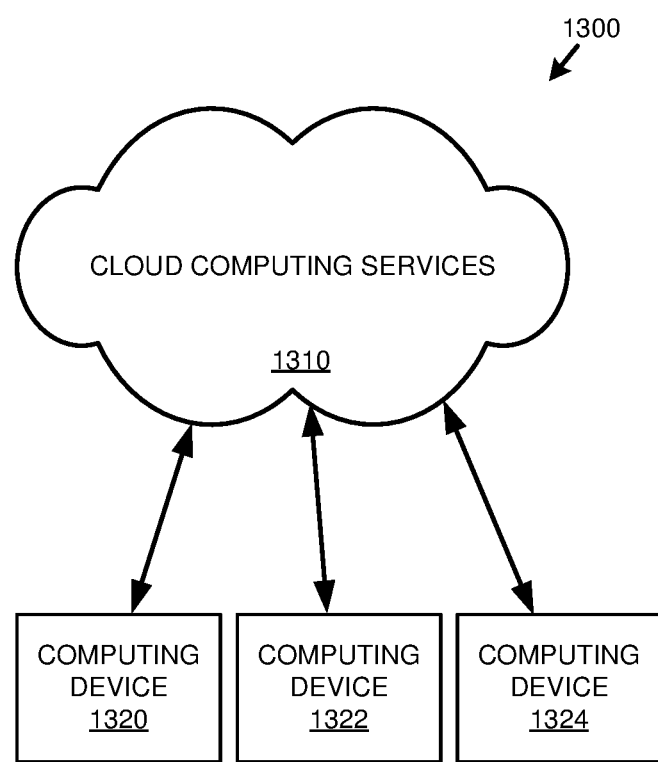
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operations (e.g., data processing, data storage, and the like).

Example 5—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more tangible, computer-readable storage media comprising:
   computer-executable instructions receiving a data network, the data network comprising at least first and second nodes, the second node being associated with a portion of stored data and useable, at least in part, to determine a first value associated with the first node by calculating, using a mathematical relationship, the first value based at least in part on at least a second value retrieved from a data source, or particular data in the data source, identified by the second node;

computer-executable instructions receiving a plurality of semantic tags;

computer-executable instructions receiving user input assigning a first semantic tag of the plurality of semantic tags to the second node, thereby creating an association between the first semantic tag and the second node; and computer-executable instructions storing the association between the first semantic tag and the second node.

2. The one or more tangible, computer-readable storage media of claim 1, further comprising:

computer-executable instructions receiving a report definition, the report definition comprising the first semantic tag;

computer-executable instructions storing the report definition;

computer-executable instructions receiving a request to execute a report;

computer-executable instructions running the report based on the report definition, including using the first semantic tag to identify the second node based on the stored association between the first semantic tag and the second node;

computer-executable instructions determining the first value associated with the first node using the portion of stored data associated with the second node; and computer-executable instructions displaying the first value associated with the first node.

3. The one or more tangible, computer-readable storage media of claim 1, further comprising:

computer-executable instructions receiving user input associating a second semantic tag of the plurality of semantic tags with the first node; and computer-executable instructions storing the association between the second semantic tag and the first node.

4. The one or more tangible, computer-readable storage media of claim 3, further comprising:

computer-executable instructions receiving a report definition, the report definition comprising the second semantic tag;

computer-executable instructions running a report based on the report definition, including using the second semantic tag to identify the second node based on the stored association between the second semantic tag and the second node;

computer-executable instructions determining the first value associated with the first node using the portion of stored data associated with the second node; and computer-executable instructions displaying the first value associated with the first node.

5. The one or more tangible, computer-readable storage media of claim 1, further comprising:

computer-executable instructions determining the first value of the first node at least in part using the portion of stored data associated with the second node.

6. The one or more tangible, computer-readable storage media of claim 5, further comprising:

computer-executable instructions displaying the first value of the first node.

7. The one or more tangible, computer-readable storage media of claim 1, further comprising:

computer-executable instructions receiving a report definition, the report definition comprising the first semantic tag; and computer-executable instructions displaying the first value associated with the first node.

8. The one or more tangible, computer-readable storage media of claim 1, further comprising:

computer-executable instructions retrieving information associated with the first semantic tag from a semantic tag store.

9. A computing system that implements a data processing service, the computing system comprising:

memory;

one or more processing units coupled to the memory; and one or more non-transitory computer readable storage media storing instructions that, when loaded into the memory, cause the one or more processing units to perform operations for:

receiving a data network comprising a plurality of nodes, each of the plurality of nodes being associated with a portion of stored data;

receiving user input defining at least one semantic tag;

receiving user input defining a report definition specified at least in part using a first plurality of semantic tags, the first plurality of semantic tags comprising the at least one semantic tag;

receiving user input comprising an indication indicating that the at least one semantic tag should be assigned to at least one of the plurality of nodes, thereby creating an association between the at least one of the plurality of nodes and the at least one semantic tag;

storing the association between the at least one semantic tag and the at least one of the plurality of nodes;

after the storing, receiving a request to retrieve data using the report definition;

retrieving the report definition; and retrieving data from at least one data store using the report definition, the retrieving data comprising:

retrieving the stored association between the at least one semantic tag and the at least one of the plurality of nodes;

determining that the at least one data store is identified by the at least one of the plurality of nodes;

retrieving at least a first portion of data stored in the at least one data store; and returning at least a second portion of data stored in the at least one data store, being selected from the at least a first portion of data or being derived at least in part from the first portion of data, in response to the request to retrieve data using the report definition.

10. The computing system of claim 9, wherein the operations further comprise:

causing the at least one semantic tag to be stored.

11. The computing system of claim 9, wherein the operations further comprise:

determining one or more values associated with one or more nodes of the plurality of nodes using the portion of stored data associated with the at least one of the plurality of nodes; and displaying the one or more values associated with the one or more nodes.

12. The computing system of claim 9, wherein the operations further comprise:

providing a report template, the report template comprising a plurality of semantic tags; and wherein the receiving user input defining a report definition comprises receiving user input associating the at least one semantic tag with the report template.

13. The computing system of claim 9, wherein the operations further comprise:
  receiving a user-defined report template; and
  wherein the receiving user input defining a report definition comprises receiving user input associating the at least one semantic tag with the report template.

14. The computing system of claim 13, wherein the operations further comprise:
  receiving user input defining a report template; and
  wherein the receiving user input defining a report definition comprises receiving user input associating the at least one semantic tag with the report template.

15. In a computing system comprising a memory and one or more processors, a method of associating one or more semantic tags with one or more nodes of a network, the method comprising:
  receiving a data network comprising a plurality of nodes, each of the plurality of nodes being associated with a portion of stored data;
  receiving a plurality of semantic tags, the plurality of semantic tags comprising a first semantic tag and a second semantic tag;
  receiving user input comprising an identifier for the first semantic tag to be assigned to a first node of the plurality of nodes, thereby creating an association between the first semantic tag and the first node;
  receiving user input comprising an identifier for the second semantic tag to be assigned to a second node of the plurality of nodes thereby creating an association between the second semantic tag and the second node; and
  storing the association between the first semantic tag and the first node and the association between the second semantic tag and the second node;
  wherein the first node and the second node are the same or the first semantic tag and the second semantic tag are the same.

16. The method of claim 15, wherein the first and second node are the same.

17. The method of claim 15, wherein the first and second semantic tags are the same.

18. The method of claim 15, further comprising:
  receiving a report definition, the report definition comprising the first semantic tag and the second semantic tag;
  running a report based on the report definition, including:
    using the first semantic tag to identify the first node based on the stored association between the first semantic tag and the first node; and
    using the second semantic tag to identify the second node based on the stored association between the second semantic tag and the second node;
  determining one or more values associated with one or more nodes of the plurality of nodes using the portion of stored data associated with the first node and the portion of stored data associated with the second node; and
  displaying the one or more values associated with the one or more nodes.

19. The method of claim 15, further comprising:
  receiving user input defining at least one user-defined semantic tag; and
  associating the at least one user-defined semantic tag with a least one of the plurality of nodes.

20. The method of claim 15, further comprising:
  causing data associated with the first semantic tag to be retrieved.

* * * * *